United States Patent [19]
Asher et al.

[11] Patent Number: 5,824,232
[45] Date of Patent: Oct. 20, 1998

[54] CORRUGATED FILTER SHEET CONFIGURED INTO A CYLINDRICAL FILTER MEDIA HAVING NEAR CIRCULAR CONCENTRIC CHANNELS

[75] Inventors: Thomas L. Asher; John R. Hampton, both of Houston, Tex.

[73] Assignee: Filtration Technologies Corporation, Houston, Tex.

[21] Appl. No.: 632,631

[22] Filed: Apr. 15, 1996

[51] Int. Cl.[6] .................................................. B01D 27/06
[52] U.S. Cl. ...................... 210/787; 210/450; 210/493.5; 210/494.1; 210/495; 210/497.1; 55/502; 55/520; 55/529
[58] Field of Search .................................. 210/493.1, 787, 210/493.5, 493.4, 497.01, 497.2, 497.1, 494.1, 495, 450; 55/520, 529, 502

[56] References Cited

U.S. PATENT DOCUMENTS

| | | |
|---|---|---|
| Re. 33,502 | 12/1990 | Gollan . |
| 1,690,564 | 11/1928 | Ward . |
| 1,742,768 | 1/1930 | Kamrath . |
| 1,861,576 | 6/1932 | Liddell . |
| 2,255,937 | 9/1941 | McNamara . |
| 2,864,505 | 12/1958 | Kasten . |
| 3,020,977 | 2/1962 | Huppke et al. . |
| 3,237,771 | 3/1966 | Greenawalt . |
| 3,361,260 | 1/1968 | Buckman . |
| 3,668,837 | 6/1972 | Gross . |
| 3,739,916 | 6/1973 | Cub et al. . |
| 4,092,246 | 5/1978 | Kummer . |
| 4,154,688 | 5/1979 | Pall . |
| 4,406,787 | 9/1983 | Süto et al. . |
| 4,439,321 | 3/1984 | Taki et al. ............................ 210/493.5 |
| 4,609,466 | 9/1986 | McCausland et al. . |
| 4,681,605 | 7/1987 | Gollan . |
| 4,738,778 | 4/1988 | Taki et al. . |
| 4,824,564 | 4/1989 | Edwards et al. . |
| 4,898,670 | 2/1990 | Gollan . |
| 5,232,595 | 8/1993 | Meyer . |
| 5,266,195 | 11/1993 | Hopkins . |

*Primary Examiner*—W. L. Walker
*Attorney, Agent, or Firm*—Fish & Richardson P.C.

[57] ABSTRACT

A filter including a first flow path having a plurality of interconnected channels and a second flow path having a plurality of interconnected channels. The channels of the first and second flow paths are alternatingly configured in a substantially concentric pattern. A filter media is interposed between the channels of the first and second flow paths. A filter including a filter media arranged in a plurality of substantially concentric layers; a fluid outflow system contacting the entirety of one side of the filter media, and a fluid inflow system contacting the entirety of an opposite side of the filter media. A method of filtering a fluid including the steps of flowing the fluid along an inflow path having a fluid permeable core member in fluid communication with a plurality of inflow channels via an inflow conduit extending radially outward from the core member, passing the fluid through a filtration media, and collecting the fluid within an outflow path having a plurality of outflow channels in fluid communication with an outflow conduit extending radially inward toward the core member. The inflow and outflow channels are alternatingly configured in a substantially concentric pattern and have the filtration media disposed therebetween.

21 Claims, 7 Drawing Sheets

CORRUGATED FILTER SHEET CONFIGURED INTO A CYLINDRICAL FILTER MEDIA HAVING NEAR CIRCULAR CONCENTRIC CHANNELS

BACKGROUND

This invention relates to the filtration of fluids (i.e., passing an unfiltered fluid through a filtration media and collecting the filtered fluid).

Filters and methods of filtration are utilized in a wide variety of industrial, clinical, laboratory, and residential settings. Such filters and methods may be used to both purify fluids (e.g., liquids and gases) and to extract compounds (e.g., fluids and solids) contained therein.

Filtration has been performed previously by using a spirally wound filter in which fluid flows along a spiral path from and/or toward the center of the filter (see e.g., U.S. Pat. Nos. 1,690,564; 1,742,768; 1,861,576; 3,668,837; 4,609,466; and 5,266,195). A representative example of such a filter is disclosed in U.S. Pat. No. 5,266,195. A sandwich of a permeate fabric material within a folded sheet of semi-permeable membrane is spirally wound together with a sheet of porous feed pathway material and secured by a thin layer of porous tape. The axial ends of the spirally wound sub-assembly are sequentially potted in resin to complete the basic fabrication of the element. Feed water supplied to an open center region flows spirally outward, while permeating purified water flows spirally inward to a porous tube which serves as a pure water discharge conduit.

Filtration has also been performed previously by using spirally wound filters in which the fluid flows along a linear path coincident with a longitudinal axis of the filter (see e.g., U.S. Pat. Nos. 3,020,977; 3,237,771; 4,092,247; and 4,824,564). A representative example of such a filter is disclosed in U.S. Pat. No. 4,824,564. The filter element is a wound spiral of filter material and a separator forming a plurality of axial flow channels. Some of these axial flow channels are open at the top to receive liquid from a top radial flow channel and closed at the bottom, and some of the axial channels are closed at the top and open at the bottom to discharge liquid from a bottom radial flow channel. Filter action is by way of radial flow, through the filter material, from the open-top channels to the open-bottom channels.

Filtration has also been performed previously by using a concentrically arranged filter element in which fluid flows along an axial path (see e.g., U.S. Pat. Nos. 3,237,771; 3,361,260; and 4,154,688). A representative example of such a filter is disclosed in U.S. Pat. No. 3,361,260. A liquid filter unit includes a pair of annular filter elements made of pleated synthetic resin-impregnated filter paper or like sheet filter material. The filter elements are mounted co-axially, one within the other. The opposite ends of both filter elements are secured to end caps so that the liquid to be filtered flows from the outside to the inside of the outer element and from the inside to the outside of the inner element towards outlet openings in one end cap.

SUMMARY

In general, in one aspect, the invention features a filter including a first flow path having a plurality of interconnected channels and a second flow path having a plurality of interconnected channels. The first and second flow paths are alternatingly configured in a substantially concentric pattern. A filter media is interposed between the channels of the first and second flow paths.

Certain implementations of the invention include one or more of the following features. The filter, in certain implementations, includes: filter channels formed from a rigid, corrugated, perforated material; channel material which is a polymer mesh; filter channels including a polymer mesh which is a polypropylene polymer overlay mesh; filter, channels which are near circular in shape; first and second flow paths each having a main conduit interconnecting the channels and extending radially across the filter; a first flow path further including a central core in fluid communication with the channels; rigid perforated support surrounding the filter; a support including a material selected from the group consisting of a polymer mesh, a rigid perforated material, a wire cage, and a strap; a first flow path which is an inflow path and a second flow path which is an outflow path; a central core having a rigid perforated tube; and a filter media having a multilayered filter media; a filter media selected from the group consisting of cellulose, polypropylene, polyethylene, polyester, fiberglass, spun-bonded material, cloth paper, nylon, orlon and combinations thereof.

In general, in another aspect, the invention features a filter including a filter media arranged in a plurality of substantially concentric layers; a fluid outflow system contacting the entirety of one side of the filter media, and a fluid inflow system contacting the entirety of an opposite side of the filter media.

Certain implementations of the invention include one or more of the following features. The filter, in certain implementations, includes: a filter media which is a single sheet; a filter media in which opposite ends of the sheet which are joined and the sheet is configured in a pattern of circumscribing near circles; a fluid outflow system which includes a plurality of outflow channels in fluid communication with an outflow conduit; a fluid inflow system having an inflow core member in fluid communication with a plurality of inflow channels via an inflow conduit; a fluid flow from a center to a periphery of the filter; a fluid inflow system having a plurality of inflow channels in fluid communication with an inflow conduit; a fluid outflow system with an outflow core member in fluid communication with a plurality of outflow channels via an outflow conduit; and a fluid flow from a periphery to a center of the filter.

In general, in one aspect, the invention features a filter including a first seal member having a fluid inlet therein. A filtration segment is coupled at one end to the first seal member and has an inflow path and outflow path. The inflow path has a fluid permeable core member operatively coupled to the fluid inlet. The core member is in fluid communication with a plurality of inflow channels via an inflow conduit extending radially outward from the core member. The outflow path has a plurality of outflow channels in fluid communication with an outflow conduit extending radially inward toward the core member. The inflow and outflow channels are alternatively configured in a substantially concentric pattern. Filter media is interposed between the inflow and outflow channels and a second seal member is coupled to an opposite end of the filtration segment.

Certain implementations of the invention include one or more of the following features. The filter, in certain implementations, includes: inflow and outflow channels which are near circular in shape; a first seal member having a gasket coupled thereto, the gasket configured to direct fluid entry into the filter via the fluid inlet; inflow and outflow channels which are a polymer mesh; a filter media having a prefilter layer, a filter layer, and a drainage layer; a fluid permeable retainer surrounding the filtration segment, the retainer coupled at opposite ends to the first seal member and the second seal member; and an outflow conduit which terminates at a layer of filter media adjacent the core member.

In general, in one aspect, the invention features a filter including a first seal member and a filtration segment coupled at one end to the first seal. The filtration segment having an inflow path and an outflow path. The outflow path has a fluid permeable core member in fluid communication with a plurality of outflow channels via an outflow conduit extending radially outward from the core member. The inflow path has a plurality of inflow channels in fluid communication with an inflow conduit extending radially inward toward the core member. The inflow and outflow channels are alternatingly configured in a substantially concentric pattern. A filter media is interposed between the inflow and outflow channels. A second seal member having a fluid outlet therein, is coupled to an opposite end of the filtration segment. The fluid outlet is operatively coupled to the fluid permeable core member.

Certain implementations of the invention include one or more of the following features. The filter, in certain implementations, includes: inflow and outflow channels which are near circular in shape; a second seal member having a gasket coupled thereto, the gasket configured to direct fluid into the inflow path; inflow and outflow channels including a polymer mesh; and a filter media having a prefilter layer, a filter layer, and a drainage layer.

In general, in one aspect, the invention features a method of filtering a fluid including the steps of flowing the fluid along a first flow path having a plurality of interconnected channels, passing the fluid through a filtration media, and collecting the fluid within a second flow path having a plurality of interconnected channels. The channels of the first and second flow paths are alternatingly configured in a substantially concentric pattern and have the filtration media disposed therebetween.

In general, in one aspect, the invention features a method of filtering a fluid including the steps of flowing the fluid along an inflow path having a fluid permeable core member in fluid communication with a plurality of inflow channels via an inflow conduit extending radially outward from the core member, passing the fluid through a filtration media, and collecting the fluid within an outflow path having a plurality of outflow channels in fluid communication with an outflow conduit extending radially inward toward the core member. The inflow and outflow channels are alternatingly configured in a substantially concentric pattern and have the filtration media disposed therebetween.

In general, in one aspect, the invention features a method of filtering a fluid, including the steps of flowing the fluid along an inflow path having a plurality of inflow channels in fluid communication with an inflow conduit extending radially inward toward a fluid permeable core member, passing the fluid through a filtration media, and collecting the fluid within an outflow path including the fluid permeable core member in fluid communication with a plurality of outflow channels via an outflow conduit extending radially outward from the core member. The inflow and outflow channels are alternatingly configured in a substantially concentric pattern and have the filtration media disposed therebetween.

As used herein, by "concentric" is meant having a common center.

By "near circle" or "near circular" is meant a shape which is substantially circular but not a complete circle (e.g., a semicircle).

Among the advantages of the invention may be one or more of the following. The alternating arrangement of inflow and outflow channels separated by a filtration media optimizes the surface area available for filtration for any given total filter size. Such an arrangement accommodates fluid flow during filtration from either inside to outside or outside to inside the filter. This arrangement also provides for extended filter life (i.e., a larger volume of solids may be collected by the filter prior to its disposal) as compared to traditional filters. The extended life of the filter results from the enhanced capacity of the inflow channel to hold solids prior to becoming plugged and the increased surface area for filtration created by the alternating inflow and outflow channels. Extended filter life reduces both the cost of filtration and the environmental impact of filter disposal. Filters arranged in this fashion are suitable for filtering a wide variety of fluids (e.g., liquids and gases) under a wide range of operational conditions.

Other advantages and features will become apparent from what follows.

DESCRIPTION

Figure 1A:
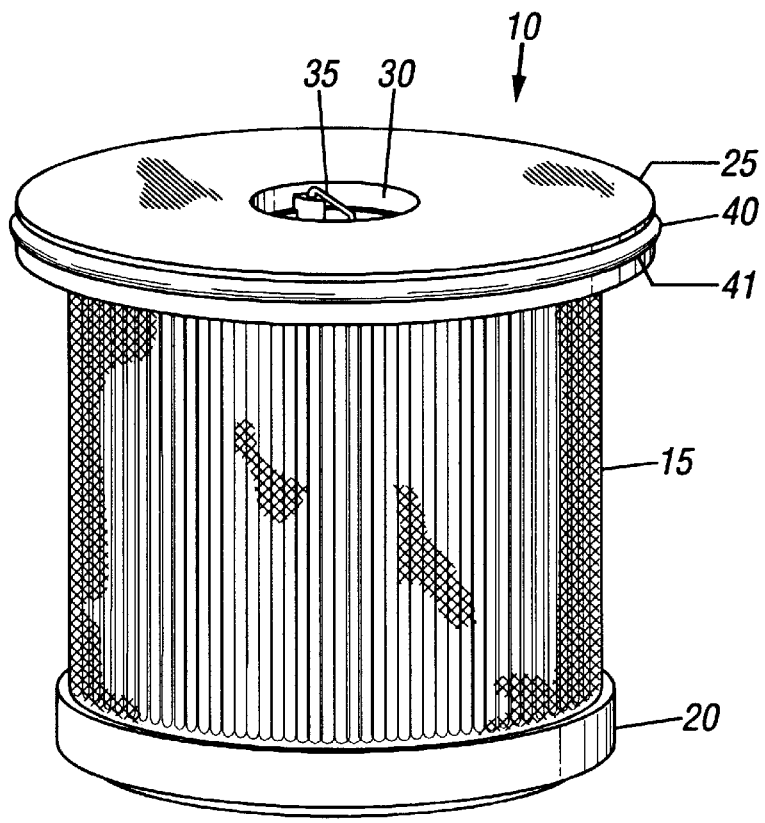
FIGS. 1A and 1B are perspective views of an inside to outside flow filter.
Figure 1B:
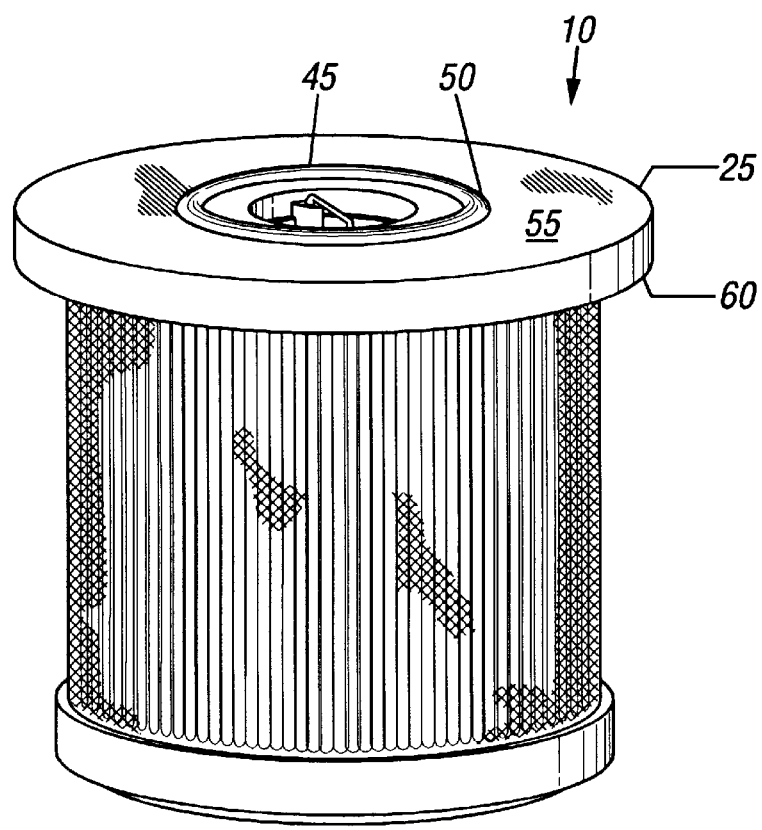
Figure 2:
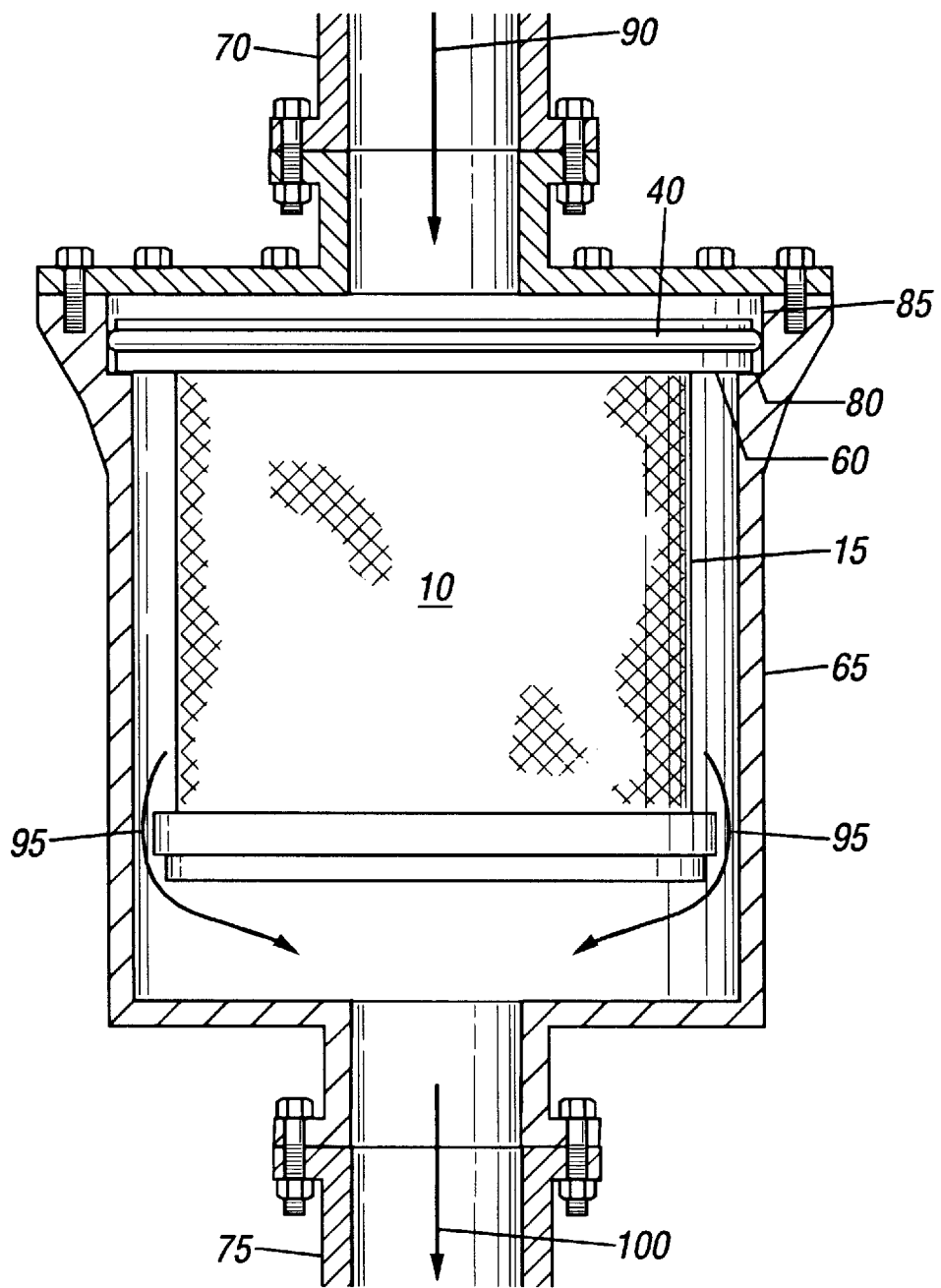
FIG. 2 is a sectional view of an inline filter housing containing an inside to outside flow filter.

Referring to FIG. 1A, an inside to outside flow filter 10 includes a filtration segment 15 sealed at opposite-ends by a bottom seal member 20 and a top seal member 25. The top seal member 25 includes a fluid inlet 30 within which a handle 35 is disposed (e.g., for convenient insertion and removal of the filter from a filter housing as shown in FIG. 2). Unfiltered fluid is prevented from bypassing the fluid inlet 30 by an O-ring 40 embedded in a slot 41 in the perimeter of the top seal member 25. Alternatively, a smaller diameter O-ring 45 may be imbedded in a groove 50 formed in the upper surface 55 of the top seal member 25 (see FIG. 1B). In another alternative scheme, top seal member 25 may include a flat gasket (not shown) coupled to a lower surface 60 of the top seal member 25. Other sealing means to insure flow through fluid inlet 30 can be used.

Referring to FIG. 2, in use, the inside to outside flow filter 10 is positioned within a filter housing 65 such that the top seal member 25 faces an upstream line 70 and the bottom seal member 20 faces a downstream line 75. The position of the inside to outside filter 10 is maintained, in part, by the interaction of the lower surface 60 of the top seal member 25 and a ledge 80 formed within the filter housing 65. The interaction of the O-ring 40 with recessed wall 85 prevents fluid from bypassing the inside to outside flow filter 10. Thus, as unfiltered fluid flows from the upstream line 70 in the direction of the arrow 90, it enters the fluid inlet 30 (not shown) and exits filter segment 15 as depicted by arrows 95. The filtered fluid then flows into the downstream line 75 in the direction depicted by the arrow 100.

Figure 3:
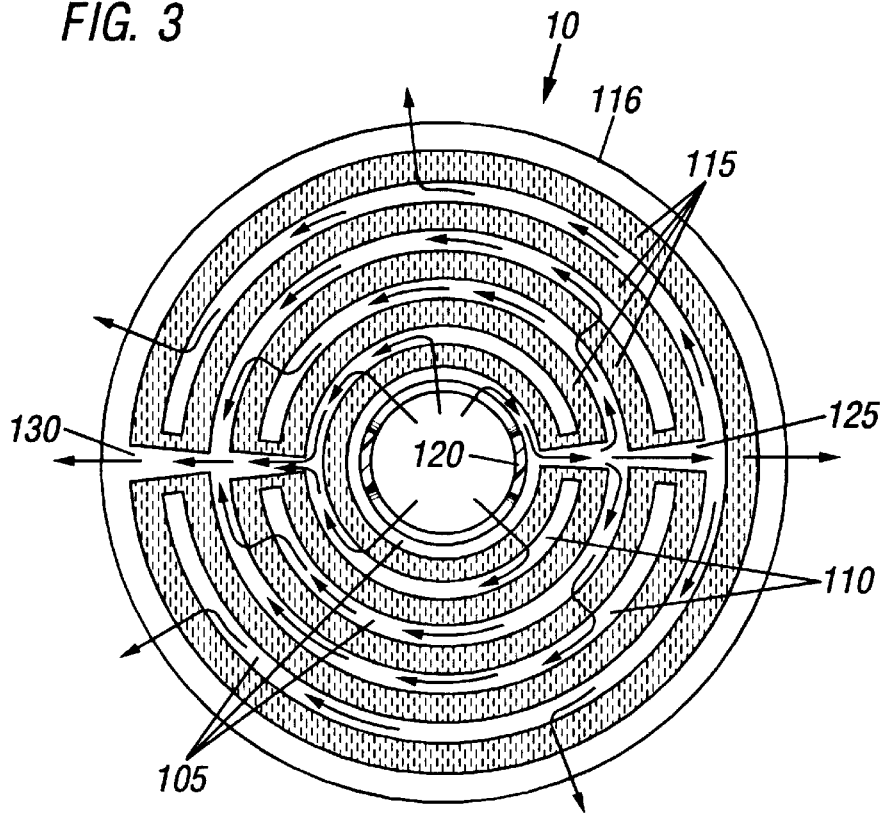
FIG. 3 is a schematic of the fluid flow pattern in an inside to outside flow filter.

Referring to FIG. 3, the flow pattern of the inside to outside flow filter 10 is defined, in part, by the alternating concentric arrangement of a plurality of near circular inflow and outflow channels, 105, 110 separated by a filter media 115. FIG. 3 is a schematic of a cross-sectional view from above the inside to outside flow filter 10 and includes a schematic of the bottom seal member 116. Unfiltered fluid enters the filter via a perforated core tube 120 and may cross the innermost layer of the filter media 115 or flow outward via an inflow conduit 125 to reach the more peripheral inflow channels 105. Unfiltered fluid passes from each of the inflow channels 105 across the filter media 115, and filtered fluid collects in outflow channels 110 or exits directly from the outermost layer of the filter media 115 into the filter housing (not shown). Filtered fluid in each of the outflow channels 110 may then collect in outflow conduit 130 and thereafter exit filter segment 15 into the filter housing (not shown). In alternative schemes, inflow and outflow channels of virtually any shape (e.g., ovals, squares, rectangles, and triangles) may be arranged in an alternating concentric pattern.

Figure 4:
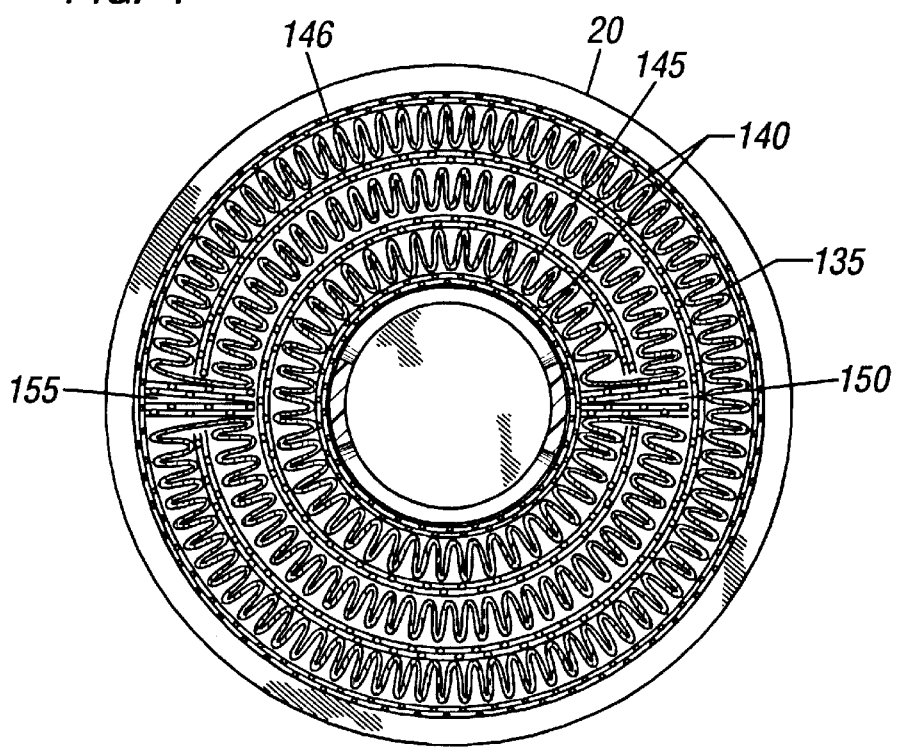
FIG. 4 is a cross-sectional view of a filter in which fluid may flow from inside to outside or from outside to inside.

In one scheme (see FIG. 4), opposite ends of a sheet of pleated filter media 135 are coupled together and the media is alternately exvaginated and invaginated to create a concentric pattern of increasingly larger near circles. A filter arranged in this manner may be used as an inside to outside flow filter or an outside to inside flow filter. When used as an inside to outside flow filter, inflow and outflow channels 140, 145 are formed on opposite sides of the pleated filter media 135 with a polymer mesh. This same polymer mesh is also used to form the inflow and outflow conduits 150, 155. The outer most layer of filter media is enclosed by a protective cage 146. Although the protective cage 146 shown is an overlay polypropylene mesh, a variety of materials (e.g., woven polymer meshes, wire cages, and cinch straps) may be used, depending upon the operational conditions encountered.

Although pleated filter media is preferred, a non-pleated media may also be used. The surface area available for filtration may be increased by increasing the number of near circular layers of filter media and/or the height of the pleats in a pleated filter media. In addition, a wide variety of filter media materials may be employed in single or multiple layers (e.g., cellulose, polypropylene, polyethylene, polyester, fiberglass, spun-bonded material, cloth, paper, nylon, orlon and combinations thereof). Moreover, depending, in part, upon the fluid to be filtered, the pressure drop across the filter, and the direction of filtration, a virtually endless number of filter media material combinations may be employed. For example, multiple layers having differing pore sizes may be used in combination. In one scheme, the filter media may include a prefilter layer, a filter layer, and a drainage layer. The prefilter layer is positioned adjacent the inflow channels and the drainage layer is positioned adjacent the outflow channels. In a preferred scheme, the prefilter layer has 75 $\mu$m diameter pores, the filter layer has either 25 $\mu$m or 10 $\mu$m diameter pores, and the drainage material is a polypropylene media having 100 $\mu$m pores.

Figure 5:
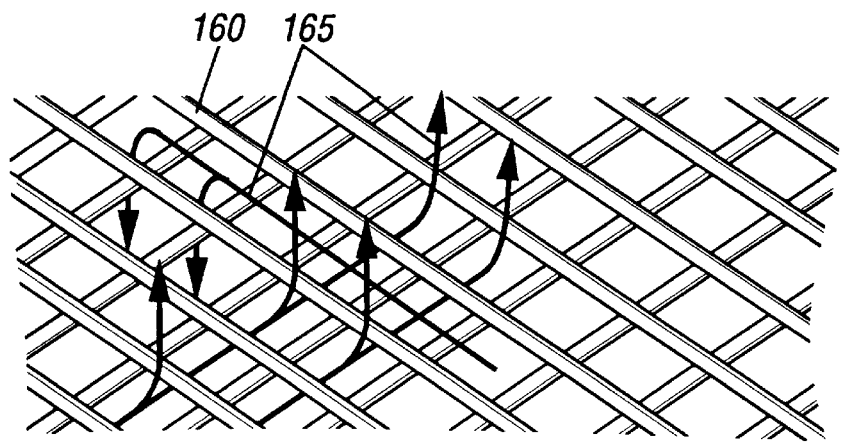
FIG. 5 is a view of a channel forming material.

Referring to FIG. 5, in one scheme, a polypropylene overlay (i.e., non-woven) mesh 160 is used to enhance flow characteristics within the inflow and outflow channels and conduits. The overlay mesh pattern is believed to facilitate fluid flow both along and across the mesh as depicted by arrows 165. Although a polypropylene overlay mesh is preferred, a variety of materials which are rigid, perforated, and corrugated may be employed as channel forming materials. For example, a wide variety of polymer meshes having an open honeycomb pattern may be used. Such materials allow the filter to withstand the pressure gradient created by filtration, to collect large amounts of solids within the inflow channels, and to allow for fluid flow both across and along the material.

Figure 6:
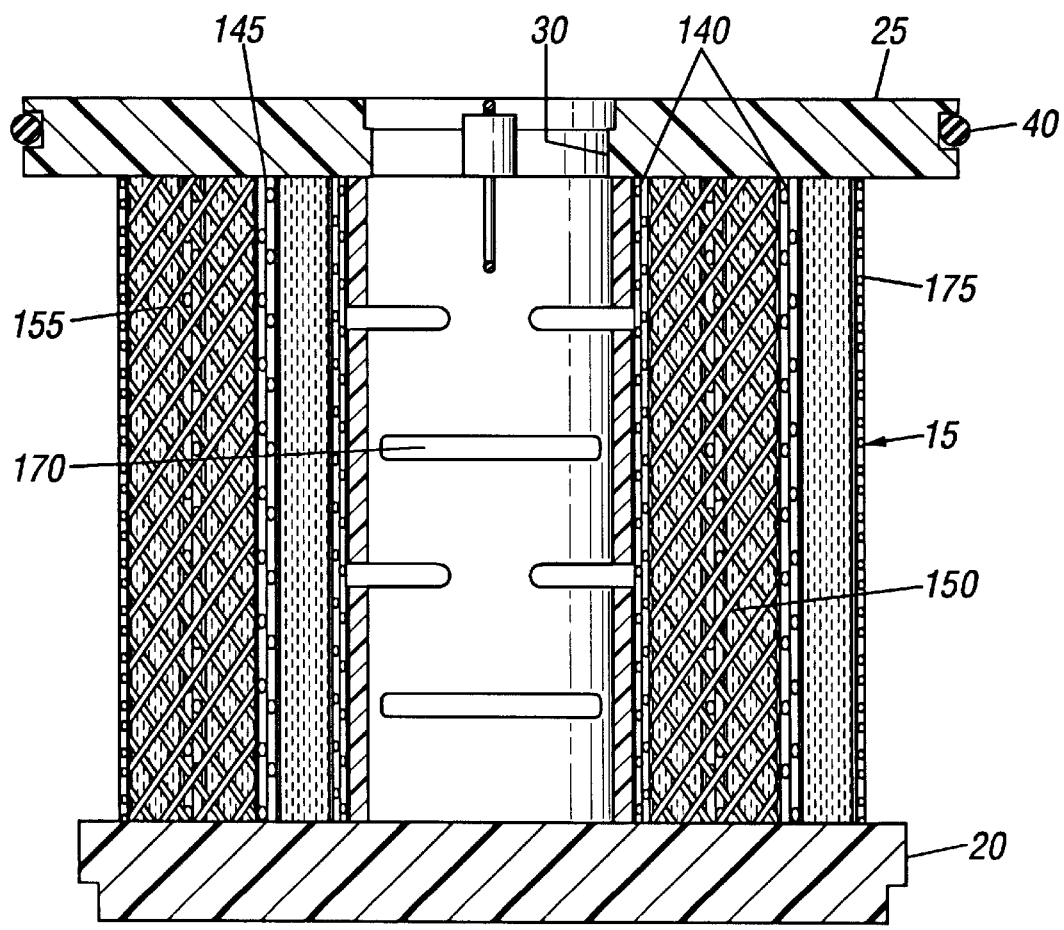
FIG. 6 is a longitudinal sectional view of an inside to outside flow filter.

Referring to FIG. 6, the perforated core tube 120 is coupled to the fluid inlet 30. The slots 170 in the perforated core tube 120 are in fluid communication with the inflow channels 140 via inflow conduit 150. Under high pressure filtration conditions, the protective cage 146 may be an interwoven polypropylene mesh 175. The interwoven polypropylene mesh 175 is coupled at opposite ends to the top and bottom seals members 25, 20 and serves to maintain the structural integrity of the filter segment 15. Although an interwoven polypropylene mesh is preferred, other widely known means of enhancing the structural integrity of filters (e.g., by using cinch straps) may be employed. Alternatively, in the absence of the interwoven polypropylene mesh 175 (see e.g., FIG. 4), the inside to outside flow filter 10 may be inserted into a wire support cage (not shown) disposed within the filter housing (see FIG. 2).

Figure 7:
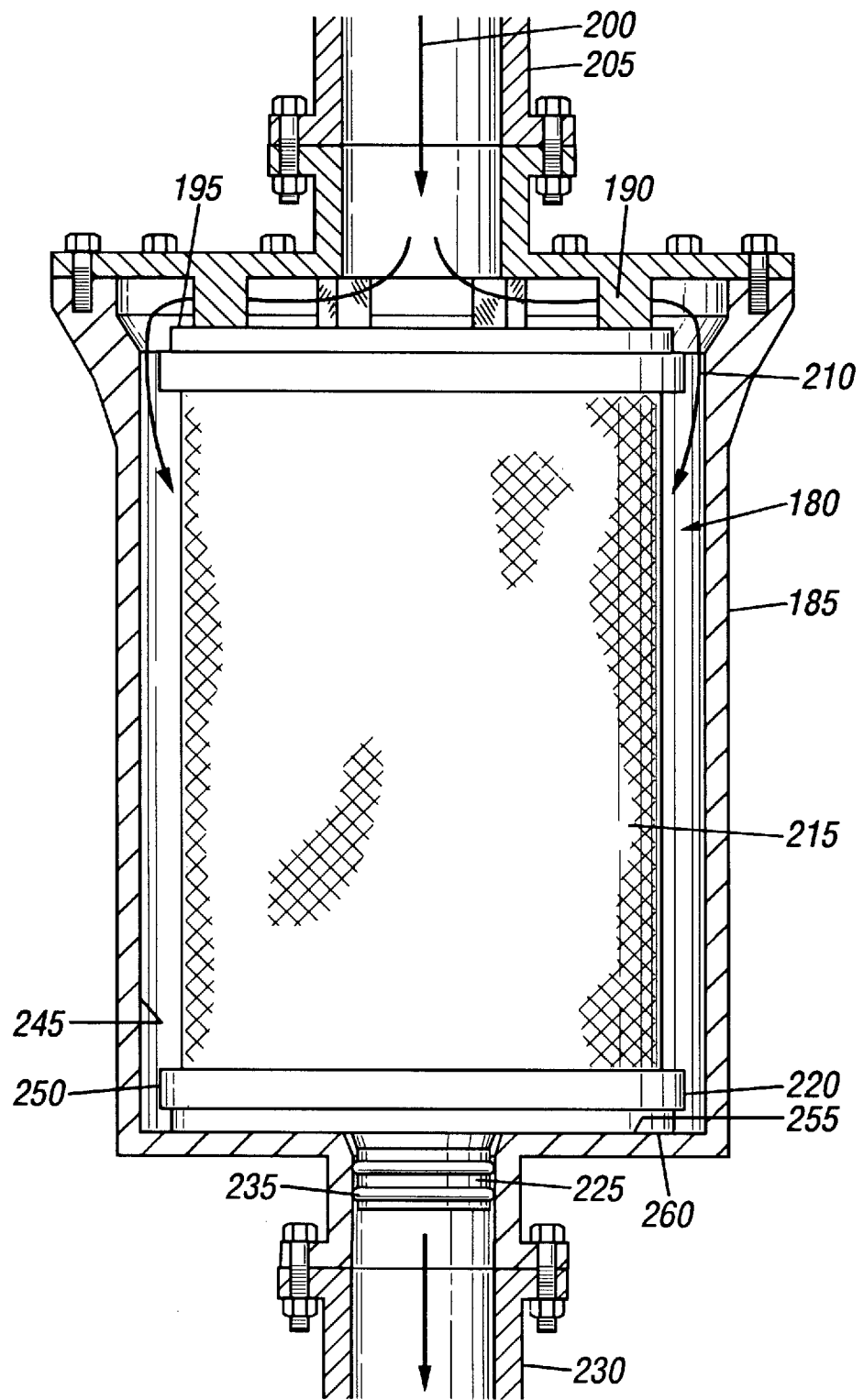
FIG. 7 is a sectional view of an inline filter housing containing an outside to inside flow filter.

Referring to FIG. 7, by using modified top and bottom seal members, the same fundamental arrangement of elements used in the inside to outside flow filter 10 may be used in an outside to inside flow filter 180. In use, the outside to inside flow filter 180 is secured, in part, within a filter housing 185 by the interaction of feet 190 with top seal member 195. A similar housing arrangement without feet may be used with the pressure flow and O-rings securing the filter in place. Unfiltered fluid flowing in the direction of arrow 200 within an upstream line 205 flows between the feet 190 and across the top plate 195 in the direction depicted by arrows 210. The unfiltered fluid enters the filter segment 215 and exits the bottom seal member 220 via an outlet 225. The unfiltered fluid is prevented from entering the downstream line 230, in part, by the O-rings 235 coupled to the outlet 225. After exiting the outlet 225, filtered fluid flows downstream in the direction depicted by arrow 240. In an alternative scheme (not shown), the O-rings 235 may be replaced with an O-ring which creates a seal between the inner wall 245 of filter housing 185 and the peripheral surface 250 of the bottom seal member 220. Alternatively, a flat gasket (not shown) may be positioned between the lower surface 255 of the bottom seal member 220 and the floor 260 of the filter housing 185.

Figure 8:
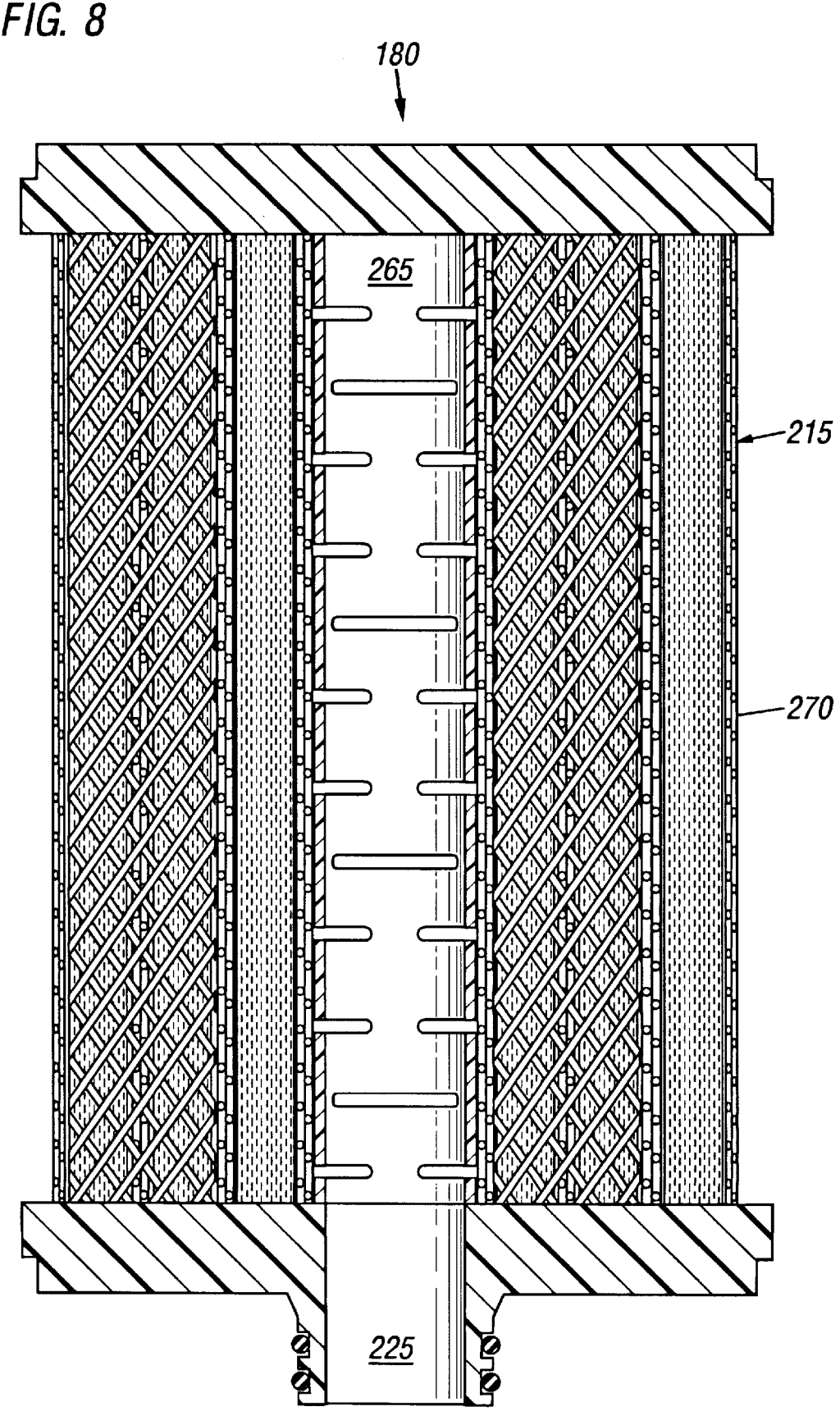
FIG. 8 is a longitudinal sectional view of an outside to inside filter.

As shown in FIG. 8, the arrangement of the filtration segment 215 of an outside to inside flow filter 180 is substantially identical to that of an inside to outside flow filter (compare FIG. 6). As noted previously, this arrangement permits fluid flow during filtration from either inside to outside or outside to inside the filter. In outside to inside flow filters in which the pressure gradient toward the center of the filtration segment 215 is high, the use of a rigid perforated core 265 and an overlay mesh 270 as a protective cage (i.e., instead of the more rigid interwoven mesh) is preferred.

Figure 9:
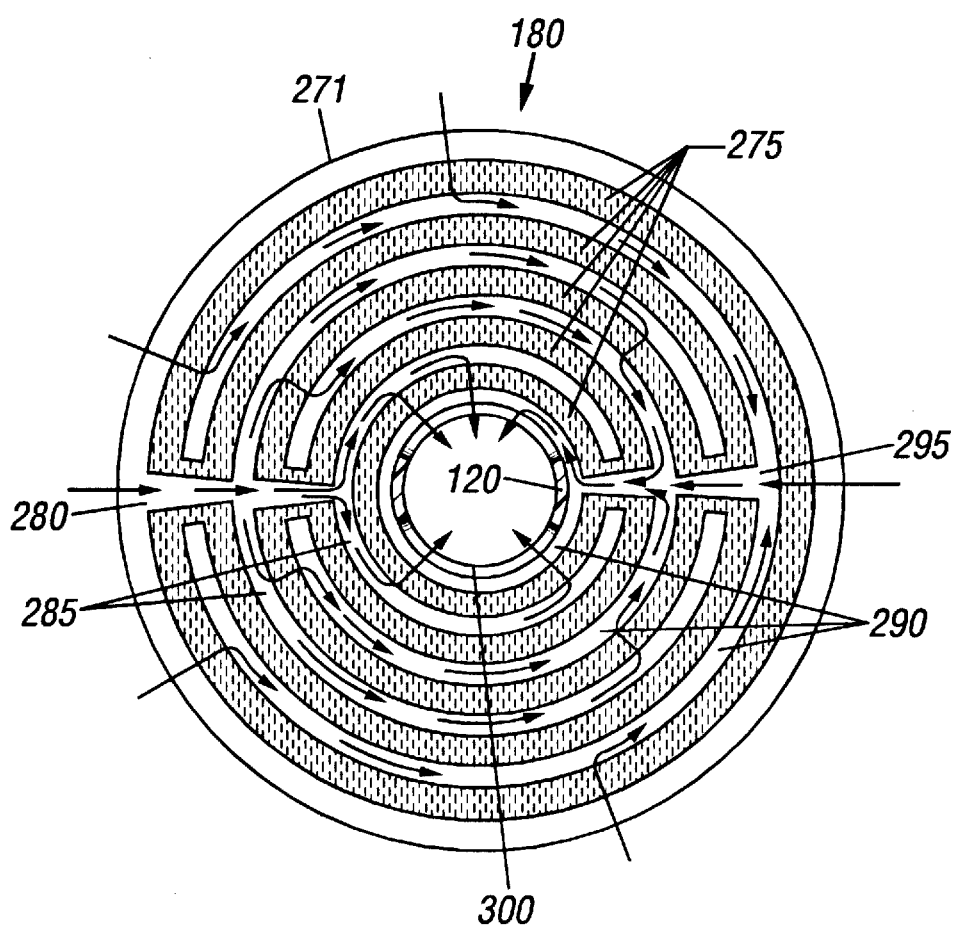
FIG. 9 is a schematic of the fluid flow pattern in an outside to inside filter.

Referring to FIG. 9, during filtration, the inflow and outflow paths of the outside to inside flow filter 180 are reversed as compared to those of an inside to outside flow filter (compare FIG. 3). FIG. 9 is a schematic of a cross-sectional view from above the outside to inside flow filter and includes a schematic of the bottom seal member 271. Unfiltered fluid enters filtration segment 215 via the inlet conduit 280 or by passing through the outermost of the filter media layers 275. Unfiltered fluid flows from the inlet conduit 280 to the near circular inflow channels 285. The unfiltered fluid then passes across the filtration media 275 and filtered fluid collects in the outflow channels 290. Filtered fluid flows from the outflow channels 290 into the outlet conduit 295, enters the perforated core 300, and then exits via the outlet 225 in the bottom seal member 220.

Other embodiments are within the scope of the following claims.

What is claimed is:

1. A filter, comprising:
    a filter sheet formed of a rigid, corrugated, perforated material;
    said filter sheet forming a cylindrical filter media having a plurality of near circular concentric channels; and
    said filter media defining a first and second radial flow path interconnecting said channels and radially extending across the filter.

2. A filter of claim 1, wherein said channels formed from said rigid, corrugated, perforated material and said first and second radial flow paths include a polymer mesh inside the channels and inside the first and second radial paths.

3. The filter of claim 2, wherein said polymer mesh comprises a polypropylene polymer overlay mesh.

4. The filter of claim 1, wherein said filter media comprises a multilayered filter media.

5. The filter of claim 1, wherein said filter media is selected from the group consisting of cellulose, polypropylene, polyethylene, polyester, fiberglass, spunbonded material, cloth, paper, nylon, orlon and combinations thereof.

6. A filter of claim 1, wherein said first radial flow path is in fluid communication with the channels and a central core.

7. The filter of claim 6, wherein said central core comprises a rigid perforated tube.

8. The filter of claim 6, further comprising a rigid perforated support surrounding said filter.

9. The filter of claim 8, wherein said support comprises a material selected from the group consisting of a polymer mesh, a wire cage, rigid perforated material, and a strap.

10. A filter, comprising:
    a first seal member having a fluid inlet therein;
    a filtration segment coupled at one end to said seal member, said filtration segment having an inflow path and outflow path,
    a fluid permeable core member operatively coupled to the filtration segment at the fluid inlet;
    said core member in fluid communication with a filter sheet formed of a rigid, corrugated, perforated material forming a cylindrical filter media having a plurality of near circular concentric channels
    said filter media defining a first and second radial flow path interconnecting said channels and radially extending across the filter; and
    a second seal member coupled to an opposite end of said filtration segment at the outflow path.

11. The filter of claim 10, wherein said first seal member further comprises a gasket coupled thereto, said gasket configured to direct fluid entry into said filter via said fluid inlet.

12. The filter of claim 10, wherein said filter media defining said first and second radial flow path further include a polymer mesh.

13. The filter of claim 10, wherein said filter media comprises a prefilter layer, a filter layer, and a drainage layer.

14. The filter of claim 10, further comprising a fluid permeable retainer surrounding said filtration segment, said retainer coupled at opposite ends to said first seal member and said second seal member.

15. The filter of claim 10, wherein at least one of said first and second radial flow path terminate at a layer of filter media adjacent said core members.

16. A filter, comprising:
    a first seal member;
    a filtration segment coupled at one end to said first seal,
    a fluid permeable core member for outflow from the filter in fluid communication with a filter sheet formed of a rigid, corrugated, perforated material forming a cylindrical filter media around the core having a plurality of near circular concentric channels,
    said filter media defining a first and second radial flow path interconnecting said channels and radially extending across the filter; and
    a second seal member coupled to an opposite end of said filtration segment, said second seal member having a fluid inlet communicating with the cylindrical filter media.

17. The filter of claim 16, wherein said second seal member further comprises a gasket coupled thereto, said gasket configured to direct fluid into said inflow path.

18. The filter of claim 16, wherein said filter media defining said first and second radial flow path further include a polymer mesh.

19. The filter of claim 16, wherein said filter media comprises a prefilter layer, a filter layer, and a drainage layer.

20. A method of filtering a fluid, comprising the steps of:
    flowing said fluid along a plurality of interconnected near circular concentric channels formed of a filter sheet of rigid, corrugated, perforated material forming a cylindrical filter media having a plurality of near circular concentric channels and defining a first and second radial flow path interconnecting said channels and radially extending across the filter;
    passing said fluid through a sheet of filtration media; and
    collecting said fluid in a central core of the cylindrical filter media.

21. A method of filtering a fluid, comprising the steps of:
    flowing said fluid along an inflow path having a fluid permeable core member in fluid communication with a cylindrical filter media of a filter sheet formed of a rigid, corrugated, perforated material having a plurality of near circular concentric channels and said filter media defining a first and second radial flow path interconnecting said channels and radially extending across the filter;
    passing said fluid through a sheet of the filtration media; and
    collecting said fluid through the radial flow paths and the outer layers of the cylindrical filter media.

* * * * *